United States Patent [19]

Soltis

[11] Patent Number: 4,805,923
[45] Date of Patent: Feb. 21, 1989

[54] ADAPTIVE CONTROL SYSTEM FOR OPERATING ADJUSTABLE AUTOMOTIVE SUSPENSION UNITS

[75] Inventor: Michael W. Soltis, Dearborn, Mich.

[73] Assignee: Ford Motor Company, Dearborn, Mich.

[21] Appl. No.: 133,985

[22] Filed: Dec. 16, 1987

[51] Int. Cl.⁴ .............................................. B60G 11/26
[52] U.S. Cl. .................................... 280/707; 280/840; 180/41
[58] Field of Search ............... 280/707, 689, 708, 772, 280/112 A, 611, 6 R, 6 H, 702, 688; 180/299, 282, 283, 285, 142, 41

[56] References Cited

U.S. PATENT DOCUMENTS

| | | | |
|---|---|---|---|
| 4,313,529 | 2/1982 | Kato et al. | 188/299 |
| 4,526,401 | 7/1985 | Kakizaki et al. | 280/707 |
| 4,621,833 | 11/1986 | Soltis | 280/707 |
| 4,666,180 | 5/1987 | Shirakuma | 280/707 |
| 4,671,534 | 6/1987 | Yano | 280/707 |
| 4,674,767 | 6/1987 | Kuroki | 280/707 |
| 4,682,675 | 7/1987 | Eddy, Jr. | 280/707 |
| 4,700,303 | 10/1987 | Tokuyama | 280/707 |

*Primary Examiner*—Richard A. Bertsch
*Attorney, Agent, or Firm*—Jerome R. Drouillard; Roger L. May

[57] ABSTRACT

A control system for governing multiple operating mode adjustable suspension units in an automotive vehicle with an adjustment mechanism for receiving an adjustment control signal for placing the suspension units in any of the multiple adjustment modes, and a fault warning mechanism for detecting an inability of the adjustment mechanism to adjust one or more of the suspension units and for generating a fault warning signal in response to such detection. The diagnostic mechanism responsive to such fault warning signal is operatively connected with the adjustment mechanism for determining the extent which the ability to adjust the suspension units has been impaired and a mode selection mechanism operatively connected with the diagnostic mechanism for deciding into which of the multiple operating modes the suspension units should be directed based upon the determination of the diagnostic mechanism, with the mode selection mechanism further including a mechanism for generating an adjustment control signal corresponding to the operating modes and for communicating such signal to the adjustment mechanism.

18 Claims, 3 Drawing Sheets

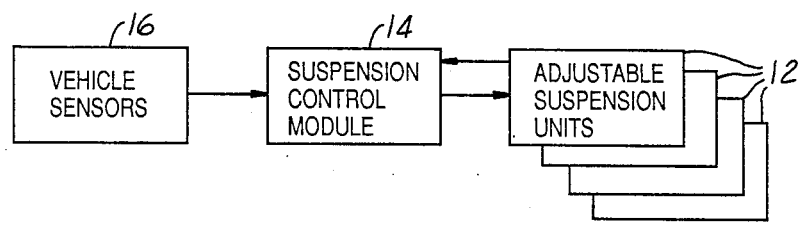
FIG.2
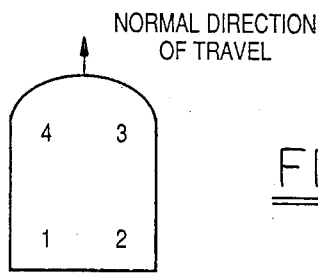
FIG.3
| STATE I.D. NO. | NORMAL POSITION | FIRM POSITION |
|---|---|---|
| 1 | 4 | 0 |
| 2 | 0 | 4 |
| 3 | 3 | 1 |
| 4 | 2 | 2 |
| 5 | 1 | 3 |
| 6 | 2 | 2 |
FIG.5

ADAPTIVE CONTROL SYSTEM FOR OPERATING ADJUSTABLE AUTOMOTIVE SUSPENSION UNITS

BACKGROUND OF THE INVENTION

1. Field of the Invention

This invention relates to a control system, for operating adjustable automotive suspension units, which has the ability to adapt to impairment of the adjustable feature of the suspension units.

2. Disclosure Information

Multistable automotive suspension units have been known for some time. Such suspension units are typically mounted between the sprung and unsprung portions of the vehicle. Suspension units defined as "multistable" have the ability to be operated in a plurality of predetermined states. Such suspension units are intended to provide control of vehicle ride and handling which may be tailored to particular road surfaces and-/or driver characteristics. In typical fashion, the particular state chosen for the multistable unit is determined by a control algorithm with inputs from a variety of vehicle parameters. For example, it is known to control a multistable suspension unit by utilizing vehicle linear acceleration, braking, steering activity, and vehicle speed as well as through a manually operable mode switch. U.S. Pat. No. 4,621,833 discloses a system for operating multistable suspension units, including feedback of the operating mode of each suspension unit.

U.S. Pat. No. 4,700,303 discloses a system for operating a vehicle height adjusting apparatus in the event that an abnormality is detected in the sensors which measure the vehicle's ride height. If such abnormality is detected, the control system will operate a compressor until a minimum pressure is produced in an air suspension system. Similarly, it is known to compensate for loss of the ability to control one or more of the suspension units in an automotive vehicle by placing all of the units into a predetermined control position. U.S. Pat. Nos. 4,526,401 and 4,666,180 disclose two control systems in which the inability to operate adjustable suspension units is compensated for by the placement of all the operational suspension units into a "normal" damping force condition. Although such control systems may cope with the loss of control of a suspension unit to a certain extent, the control schemes set forth in the '303, '401 and '180 patents are not adaptive inasmuch as they lack the capability of selecting an operating mode for any viable suspension units which operating mode takes into account the specific nature of the inability to adjust one or more of the remaining suspension units. Too, such systems do not provide for the contingency that the "normal" adjustment position may not be attainable.

It is an object of the present invention to Provide an adaptive control system for operating adjustable automotive suspension units having the ability to detect units which are not capable of being fully operated and to evaluate the extent to which the ability to operate such units has been impaired, and having done so, to select an operating position for each of the operable suspension units.

It is an advantage of the present invention that a control system according to this invention will minimize the degradation of ride control of a vehicle in the event that one or more of the adjustable suspension units becomes inoperative.

Other objects, features and advantages of the present invention will become apparent to those skilled in the art to which is invention pertains.

SUMMARY OF THE DISCLOSURE

In accordance with this invention, a control system for governing a plurality of multiple operating mode adjustable suspension units in an automotive vehicle includes adjustment means for receiving adjustment control signals and for placing the suspension units in any of the multiple adjustment modes, and fault warning means for detecting inability of the adjustment means to adjust one or more of the suspension units and for generating a fault warning signal in response to such detection. A system according to this invention further includes diagnostic means responsive to such fault warning signal and operatively connected with the adjustment means for determining the extent to which the ability to adjust the suspension units has been impaired, and mode selection means operatively connected with diagnostic means for deciding into which of the multiple operating modes the suspension units should be directed based upon the determination of diagnostic means. The mode selection means further comprises means for generating an adjustment control signal corresponding to the operating modes and for communicating the signal to the adjustment means. The mode selection means may further comprise standard operating means for receiving vehicular operating data and means for using such data as well as recorded suspension unit responses for deciding into which of said multiple operating modes said suspension units should be directed.

A control system according to this invention may determine the extent to which the ability to adjust the suspension units has been impaired by commanding the adjustment means to sequentially place the units into at least two of the multiple operating modes and by observing the responses of the suspension units to such commands. A mode selection means according to this invention will compare the results of the sequential operation of the suspension units by the diagnostic means to a ranked order of states of impairment of the suspension units and select an attainable operating mode which is preferred according to such ranked order. The mode selection means may individually select an operating mode for each of the suspension units based upon the results of the diagnostic process or, alternatively, the mode selection means may select a single operating mode for all of the suspension units based upon the results of the diagnostic sequence and the comparison of the diagnostic results with the ranked order of states of impairment.

According to an embodiment of this invention, a diagnostic means will gather data for each of the adjustable suspension units by commanding the adjustment means to sequentially place each of such units into at least two of the units' multiple operating modes and by recording the responses of the suspension units to each command. In the event that individual data are taken for each suspension unit, the mode selection means may generate an adjustment control signal depending upon the results of the diagnostic means inquiry with an individual signal being communicated to each of the adjustment means. Accordingly, as used here, the term "adjustment means" refers either to a single adjustment means for operating a plurality of suspension units, or individual adjustment means for operating only a single suspension unit.

In the event that a control system according to the present invention is used for governing a plurality of automotive suspension units adjustable to normal and firm operating positions, such a control system may comprise adjustment means for receiving adjustment control signals and for placing such suspension units into either of the named operating positions, and fault warning means as described above. This system will also include diagnostic means responsive to a fault warning signal and operatively connected with the adjustment means for commanding the adjustment means to sequentially place the suspension units into firm and normal operating positions and for noting the results of the commands. Finally, a system according to this invention for use with suspension units having normal and firm operating positions will comprise mode selection means operatively connected with the diagnostic means for deciding whether the suspension units should be directed into the normal or the firm position, with the mode selection means including means for comparing the results of the sequential operation of the suspension units by the diagnostic means to a ranked order of states of impairment of the suspension units. The mode selection means will select the operating mode which is most preferable according to the ranked order. As before, the mode selection means further comprises a means for generating an adjustment control signal corresponding to the firm or normal operating modes and for communicating such signal to the adjustment means. The mode selection means may select a single operating mode into which each suspension unit is to be directed or an individual operating signal for each suspension unit.

A method for governing a plurality of multiple operating mode adjustable suspension units in an automotive vehicle according to the present invention comprises the steps of detecting a loss of control of the adjustability of one or more of the suspension units, attempting to place the suspension units in an authorized operating position upon detection of such loss of control, and detecting the resulting operating position of the suspension units. In the event that the suspension units have moved to such authorized operating position, the control system will be inhibited from making any further changes in the operating positions of the suspension units. In the further event, however, that the suspension units have not assumed an authorized operating position, a method according to this invention further includes the steps of determining the extent to which the ability to adjust the suspension units has been impaired, and thereafter selecting an operating position for the suspension units based upon the determination of the extent of the adjustment impairment. Finally, the suspension units will be directed into the selected operating position. The authorized operating position in which a method according to this invention first attempts to direct the suspension units may comprise the position which the suspension units occupied immediately preceding the detection of the loss of control of adjustability. Alternatively, the authorized operating position may comprise a normal operating position which allows the suspension units to operate in an acceptable manner.

BRIEF DESCRIPTION OF THE DRAWINGS

FIG. 2 is an overall system block diagram in accordance with an embodiment of this invention.

FIG. 3 contains a schematic representation of a vehicle and identifies the suspension units of the vehicle by number.

FIG. 5 illustrates a ranked order of the states of impairment for a total of four two-position suspension units. This ranked order is useful for practicing the present invention.

DESCRIPTION OF THE PREFERRED EMBODIMENT

Figure 1:
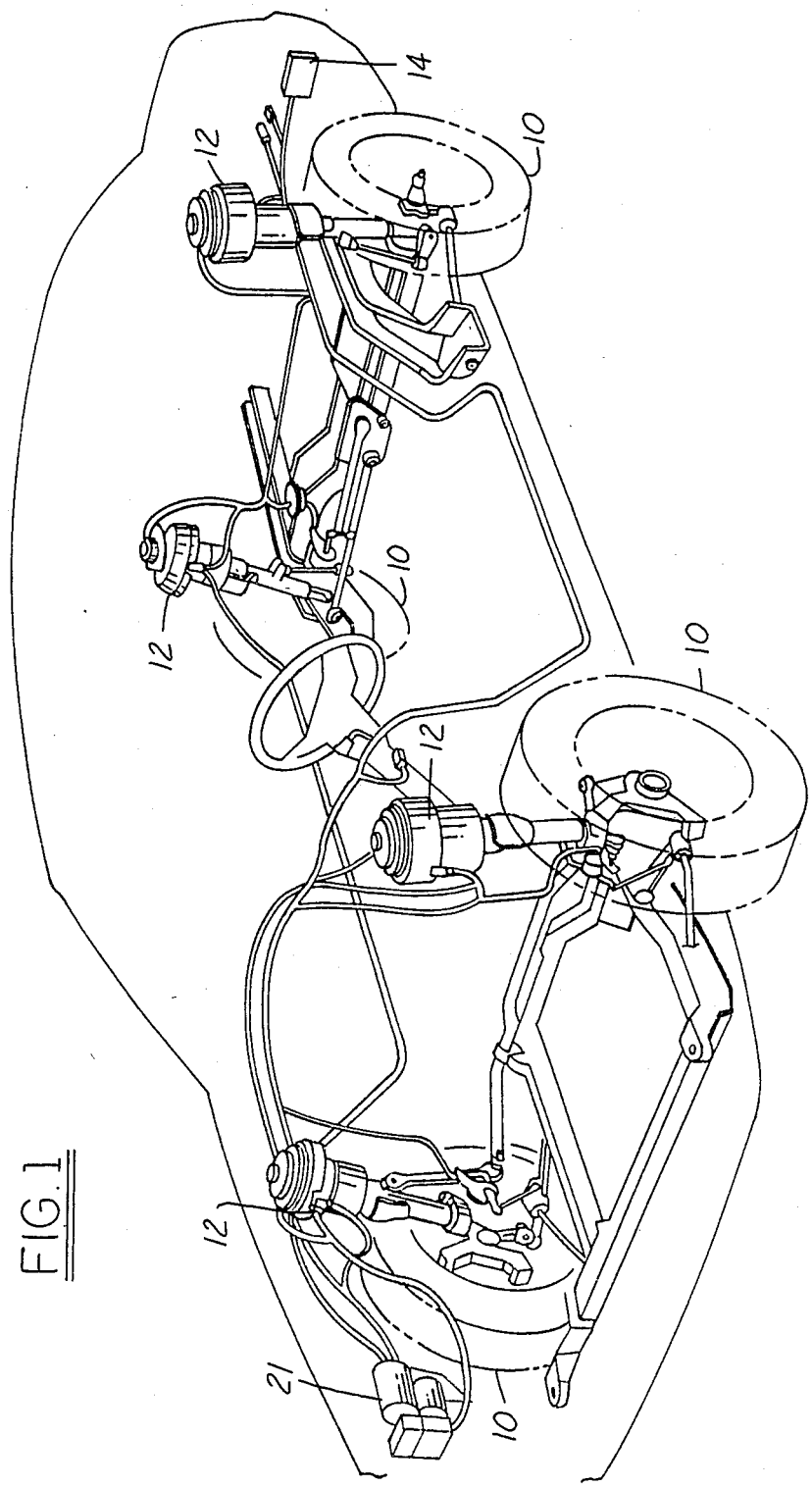
FIG. 1 is a perspective drawing of a motor vehicle incorporating a system according to the present invention. This figure shows the various components of the system embodying the present invention.

As shown in FIG. 1, a control system according to the present invention is intended for use with adjustable suspension units typically found in automotive vehicles. U.S. Pat. Nos. 4,313,529; 4,621,833 and 4,666,180, which are hereby incorporated by reference, disclose adjustable suspension units which are exemplary of but a portion of the class of suspension units which may be controlled by a system according to the present invention.

The motor vehicle in FIG. 1 is equipped in conventional fashion with adjustable air spring suspension units 12, which serve to control the vertical motion of wheel and tire assemblies 10. The air springs are supplied with compressed air by compressor 21, which is electrically powered by the vehicle's battery. Each of adjustable suspension units 12 is operatively connected with and controlled by suspension control module 14. The control module includes a micropressor and may be arranged according to a number of different architectures. Those skilled in the art will appreciate in view of this disclosure that each such architecture could generally include an input-output control circuit (I/O) for exchanging data with external devices and a random access memory (RAM) for temporarily holding data while the data are being processed. Control programs including unit commands will be sequentially read from a read-only memory (ROM). Unit commands will be executed by a central processing unit (CPU). Those skilled in the art will further appreciate in view of this disclosure that the system shown in FIG. 1 represents merely one preferred embodiment of the present invention, it being understood that this invention is suitable for use with other suspension units such as air/hydraulic or hydraulic load bearing units or combination adjustable load bearing and adjustable damping units such as those known in the art. A system according to this invention could be employed in conjunction with the control of damping, or spring rate, or both functions. This system could also be employed in conjunction with adjustable suspension units having variable ride height or spring load control characteristics. Furthermore, the present invention could be applied preferentially to the suspension units located at only one end of the vehicle such as the front or rear.

A system according to the present invention is operated by the suspension control module 14 which receives inputs from each of the suspension units as well as inputs from various vehicle sensors. According to the needs of the vehicle being considered for a system according to this invention, the vehicle sensors could include a steering sensor, brake sensor, speed sensor, suspension ride height sensor, manual mode selection switch or other types of sensing devices. Alternatively, a system according to the present invention could be employed in connection with a simple multi-positionable manual suspension control device, such as a switching device for placing adjustable suspension units into either of two selectable positions. In any event, the purpose of each of the sensing devices is to help the control unit to decide which of the multiple operating modes the suspension units should be placed into during the normal operation of the system. As explained above, a system according to the present invention is intended to make decisions regarding what operating positions the various suspension units should be placed into in the event that the system has lost the full ability to properly control each of the individual suspension units. This inability of the adjustment means to adjust one or more of the suspension units could result from a variety of sources such as broken power supply conductors affecting individual suspension units, incorrectly wired signal conductors causing erroneous adjustments, or yet other sources. For example, with a two-position adjustable suspension unit, one type of inability of the adjustment means to properly adjust the unit would occur were the control wiring to be transposed such that a "firm" adjustment command signal is met with a "normal" adjustment.

As shown in FIG. 2, suspension control module 14 receives input data from vehicle sensors 16 and adjustable suspension units 12. The information received from these adjustable suspension units by the suspension control module comprises a feedback signal indicating the position of the suspension unit. Devices for providing such position feedback are disclosed in U.S. Pat. Nos. 4,526,401, and 4,621,833. In general, position feedback devices may be viewed as multi-position switches which track the actual positions of the individual suspension units, so that the actual positions may be compared with the ordered positions, with any discrepancy being recorded in a register within the suspension system control module.

Operation of a system according to the present invention will now be explained with reference to a system in which the adjustable suspension units have only two operating positions i.e., a "normal" and a "firm" position. These positions could characterize changes in the damping or spring rates, or both. Those skilled in the art will appreciate that the following example is not meant to limit the application of the present invention. Accordingly, as previously noted, a system according to this invention could be used to control suspension units having three or more individual damping rates or multiple spring rates, or both.

During normal operation of the present system, the control module's computer decides when the adjustable suspension units should be moved from the normal to the firm position and vice versa. This mode selection may be accomplished through a variety of adjustment means. U.S. Pat. No. 4,621,833 discloses such a means in which a multi-positionable electromagnetic motor causes a control valve within the shock absorber to move to one of two operating positions. The computer will then record, in a suitable register, the movement of the suspension unit into the directed operating position. If, however, the suspension unit does not move into the designated position, the computer will note such failure and generate a fault warning signal. This could be accomplished by feeding the output of a multi-positionable switch, such as that illustrated in U.S. Pat. No. 4,621,833, to the diagnostic and mode selection portions of the present system. Because the multi-positionable switch tracks the actual position of the suspension unit's adjuster, the diagnostic means may use the position information to determine the extent of the system's impairment by comparing a commanded position to the actual position of the suspension unit. Similarly, the mode selection means will utilize position feedback to keep track of the actual position of each of the suspension units.

Upon generating a fault warning signal, the computer will determine the extent to which the ability to adjust the suspension units has been impaired. This diagnostic process may be accomplished by commanding the suspension unit adjustment means to sequentially place the suspension units into at least two multiple operating modes and by observing the responses of the suspension units to such commands. These processes are shown in blocks 30 and 32 of FIG. 4.

In block 30, the computer's CPU reads an instruction from the ROM and commands the adjustment means to place the adjustable suspension units into the firm position or firm operating mode. After this command has been given, the computer tabulates the number of suspension units in the firm position. If the last command to the suspension units prior to generation of the fault warning signal was the "firm" command, however, such command need not be duplicated. Having made the first tabulation, the computer moves to block 32 wherein the adjustment means is commanded to place the units into the normal operating position. As before, the computer tabulates or counts the number of units which have actually moved into the normal operating position. The computer then moves on with the balance of the algorithm which implements the ranking system shown in FIG. 5.

FIG. 5 illustrates a ranked order of six possible states of impairment for four adjustable suspension units. The columns labeled "Normal Position" and "Firm Position" contain entries corresponding to the numbers of suspension units (out of a total of four) capable of being placed into the indicated operating position, whether normal or firm. State No. 1 is the most desirable state with state No. 6 being the least desirable. State No. 1 indicates that it is most desirable in the event that the fault warning means has detected an inability of the adjustment means to adjust one or more of the suspension units that the system be operated if possible such that all four of the suspension units are placed into the normal position. Of course, because there are only four suspension units in the vehicle being discussed herein, none of the shock absorbers are in the firm position. Thus, state No. 1 shows four suspension units in the normal position, and zero units in the firm position. Moving to state 2, if it is not possible to place all four shock absorbers in the normal position but it is possible to place all four in the firm position, this state will be selected in preference to any other state. In state 3, if it is not Possible to place all four shock absorbers in either the normal position or in the firm position, but it is possible to place three of the shock absorbers in the normal position with the fourth remaining in the firm position, this state will be selected. States 4 and 6 present separate cases wherein two of the shock absorbers are in the normal position and two are in the firm position. In state 4, it is assumed that two of the shock absorbers on one side of the vehicle are in the normal position and two on the other side of the vehicle are in the firm position. Alternatively, state 4 also stands for the condition wherein two of the shock absorbers at the front of the vehicle are firm whereas two at the rear are in the normal position. In state 6, on the other hand, it is assumed-that both of the shock absorbers at the rear of the vehicle are in the firm position whereas two in the front are in the normal position, or alternatively it is assumed that, for example, the left front and right rear are in the normal position, whereas the right front and left rear shock absorbers are in the firm position. Finally, in state 5 it is assumed that in the event it is possible to place three shock absorbers in the firm position but only one in the normal position, such a position is preferable to the state shown as state No. 6 and, therefore, this state will be selected.

Figure 4:
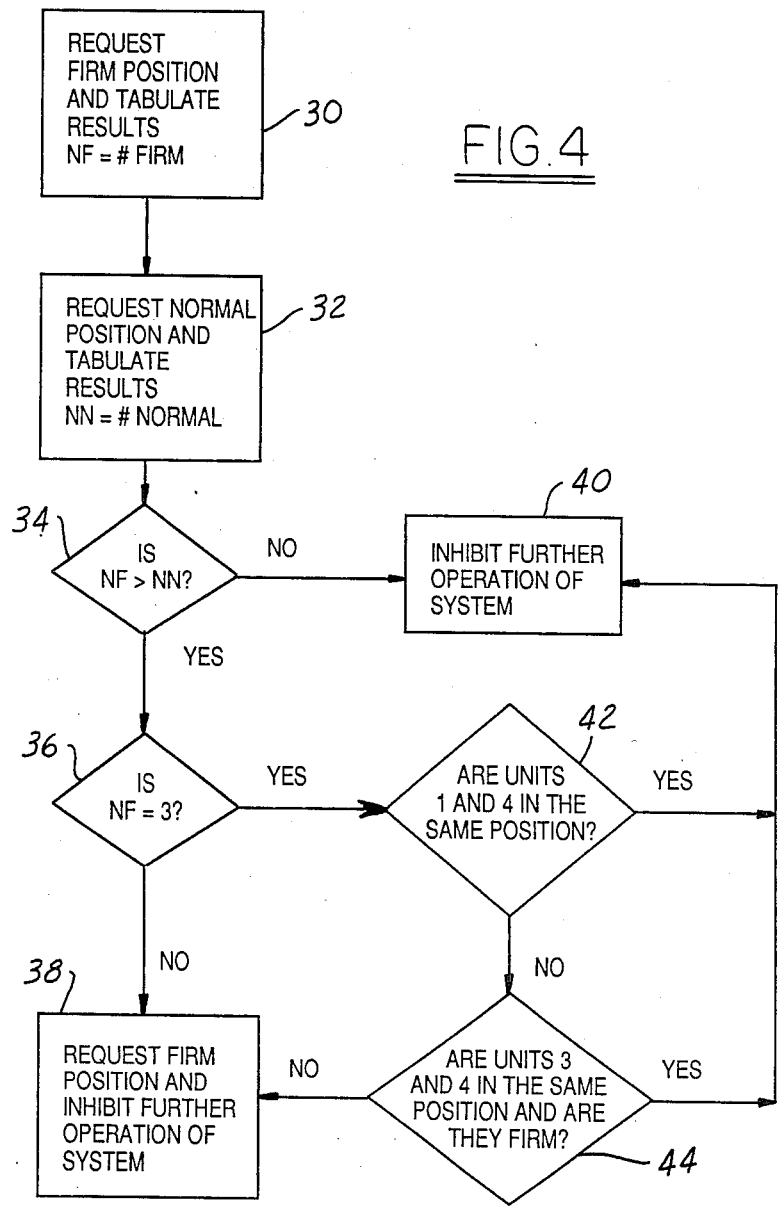
FIG. 4 contains a logic flow block diagram in accordance with an embodiment of this invention.

As previously discussed, the ranked order of FIG. 5 is implemented for a two-position shock absorber system by the logic algorithm contained in FIG. 4. This algorithm is for a system in which the mode selection means comprising the microprocessor, multi-positionable electromagnetic motors, and interconnecting electronic devices, selects a single operating mode for all of the suspension units based upon the results of the operation of a diagnostic means as well as the results of a comparison of the such results with the ranked order of FIG. 5. Other algorithms could be employed according to the present invention to provide individual control for each of the suspension units, based upon the results of the diagnostic routine and a subsequent comparison with a suitable ranked order scheme. For example, during the steps shown in blocks 30 and 32 of FIG. 4, if the microprocessor tracks the position of each suspension unit individually, it will know if any of the suspension units have been wired incorrectly such that control commands are inverted with the result that a "firm" adjustment command is met with a "normal" adjustment, and vice-versa. If such is the case, the microprocessor will know that it is possible to operate the defective suspension units by giving such units an adjustment command which is nominally opposite to the desired command.

Continuing now with the explánation of FIG. 4, at block 34 the computer asks the question whether more shock absorbers are capable of being shifted to the firm position or more to the normal position. If the answer is no, in other words, if more shock absorbers are capable of being placed into the normal position than the number capable of being placed into the firm position, the computer will transfer to block 40 wherein further operation of the system will be inhibited. Accordingly, at block 40 the suspension units will be maintained in the position which they occupied when the computer requested at block 32 be placed in the normal position. If the question at block 34 is answered in the positive, i.e., if the number of shock absorbers capable of being placed in the firm position exceeds the number capable of being placed in the normal position, the computer transfers to block 36 wherein the number capable of being placed in the firm position is compared with the number three. If the number of shock absorbers capable of being placed in the firm position is not equal to three, logic dictates that the number being capable of being placed in the firm position must be equal to four because from block 34 it is already known that the number of firm shock absorbers exceeds the number of normal shock absorbers. Having answered the question of block 36 in the negative, the algorithm transfers to block 38 wherein the firm position is requested and further operation of the system is inhibited. Accordingly, at block 38 the shock absorbers will be placed in a firm position. In the event that NF equals four, all four shock absorbers will be placed in the firm position. Returning now to block 36, if the question within block 36 is answered in the affirmative, the algorithm transfers to block 42 wherein a question is asked regarding the positions of units 1 and 4. Reference should be made herein to FIG. 3 wherein the relative positions of the suspension units is shown with reference to a schematic diagram of an automobile. It is sen from FIG. 3 that units 4 and 1 comprise the left front and left rear units respectively. If these units are in the same position, the algorithm transfers from block 42 to 40 wherein further operation of the system is inhibited. Accordingly, all four suspension units will remain in the position which they occupied at the time the computer requested the normal position at block 32. If the question in block 42 is answered in the negative, the algorithm transfers to block 44 wherein the positions of units 3 and 4 are compared to each other and also a question is asked whether suspension units 3 and 4 are in the firm position. If units 3 and 4 are in the same position and that position is the firm position, the algorithm will transfer to block 40 with the result that the suspension units will be maintained in a position they occupied at block 32. If both questions of block 44 are not answered in the positive, the algorithm transfers to block 38 wherein the units are requested to move to the firm position. The result of this request will presumably be the same result as that achieved in block 30 wherein the units were originally requested to move into the firm position.

To the extent possible, the logic embodied in blocks 42 and 44 prevents state 6 of FIG. 5 from prevailing. Thus, in block 42 if units 1 and 4 are in the same position, it is known that units 1 and 2 cannot be in the firm position while units 3 and 4 are occupying the normal position. It is also known that units 1 and 3 cannot be in the normal position while units 4 and 2 are occupying the firm position. If the answer to the question at block 42 is "no" and the computer transfers to block 44, and the answers to the questions in block 44 are "yes", it will be known that state 6 has been avoided because suspension units 3 and 4 are in the firm position and as a result, neither of the conditions in state 6 are possible. If, on the other hand, the answer to the question in block 44 is "no", state No. 6 is present, and the suspension units will therefore be placed in the firm position at block 38. Because the computer knows from block 36 that the number of units capable of being placed in the firm Position is 3, both subsets of state No. 6 will be avoided. With three suspension units in the firm position, it will not be possible for both units 1 and 2 to be in the firm position whereas units 3 and 4 are in a normal position. Similarly, it will not be possible for units diagonally opposed to occupy the same positions.

Those skilled in the art will appreciate in view of this disclosure that the embodiment described herein in which the mode selection means implements a ranked order through the use of a logic algorithm contained in a software program, comprises but one means for executing a comparison of the results of a sequential operation of suspension units by a diagnostic means to a ranked order. Comparison of the results of the operation of suspension units by a diagnostic means to a ranked order of states of impairment could also be accomplished by recording the individual operating characteristics of each suspension unit and by using the recorded results in conjunction with a lookup table contained within the computer's ROM so as to select an operating mode for each of the suspension units. For example, if it is determined by the diagnostic operation of the suspension units that units 1 and 2 at the rear of the automobile are capable of being positioned in both the firm and normal operating positions, but units 3 and 4 at the front of the vehicle may be positioned only in the normal position, this information could be entered into a lookup table contained within the ROM and, according to FIG. 5, because the situation with the shock absorbers could result in both rear units being positioned in the firm position whereas the front units are in the normal position, this state would be undesirable and as a a result, the ROM would indicate that all 4 units should be placed in the normal position, with further operation of the system inhibited. Those skilled in the art will further appreciate in view of this disclosure that an alternate means of implementing a system according to the present invention could include the direct recording of the results of the diagnostic operation of the system, in terms of the states shown in FIG. 5, rather than by recording the responses as shown in blocks 30 and 32 of FIG. 4.

As noted above, although the examples set forth herein with reference to FIGS. 4 and 5 describe operation of a system in which the same command is given to all four suspension units, those skilled in the art will appreciate in view of this disclosure that the mode selection means could be employed for selecting not only a single operating mode for all the suspension units but, alternatively, an individual operating mode could be selected for each of the units based upon the results of the diagnostic operation and a comparison of those results with the ranked order.

A system according to the present invention may operate with the following steps. First, in order to trigger operation of the system, the system will detect a loss of control of the adjustability of one or more of the suspension units. This detection will be answered with an attempt to place the suspension units in an authorized operating position. After such attempt, the resulting operating positions of the suspension units will be noted and the system will be inhibited from making further changes in the positions of the suspension units in the event that the suspension units have moved to the authorized operating position. If, however, the suspension units have not moved to the authorized operating position the system will then determine the extent to which the ability to adjust the suspension units has been impaired and will then select an operating position for the suspension units based upon the determination of the extent of adjustment impairment. Having done so, the system will be in a position to direct the suspension units into a selected operating position. The authorized operating position described herein may comprise the position which the suspension units occupied at a time immediately preceding the detection of the loss of control of adjustability or, alternatively, the authorized operating position may comprise a normal operating position which allows the suspension units to provide acceptable ride control characteristics.

Although the present control system has been described as a system for handling a vehicle suspension having impaired adjustment functionality, a system according to the present invention could further comprise standard operating means for receiving vehicular operating data and means for using such data as well as recorded suspension unit responses for deciding into which of the multiple operating modes the suspension units should be directed. The standard operating means could be structured according to the lines of the system disclosed in U.S. Pat. No. 4,621,833 and in general could include a logic algorithm comprising a logical "OR" strategy such that the suspension units are ordered to an adjusted position whenever one or more of a plurality of control conditions has been satisfied. For example, the multistable suspension units of the '833 patent are ordered to the firm position whenever one of several individual vehicular inputs is present. These include brake operation, operation of the vehicle's throttle above a threshold level, operation of the steering system at an angle exceeding a threshold, and operation by the driver of a manual selection switch. In the event that a system according to the present invention detects an abnormal condition in terms of the inability to adjust one or more suspension units, the standard operating portion of the system could continue to operate the system in the attainable operating modes according to the normal operating procedure, including, for example, the previously described logic algorithm. Accordingly, a system according to this invention need not inhibit completely the operation of the adjustable suspension units as specified in block 40 of FIG. 4.

Various modifications and variations will no doubt occur to those skilled in the arts to which this invention pertains. For example, the particular algorithm chosen to operate a system according to this invention may be selected according to the dictates of a particular vehicle equipped with such a system. Similarly, although the present system has been described in terms of a computerized mode selection system comprising a microprocessor, a system according to this invention could be implemented with an electronic system employing discrete circuit components or other conventional electronic circuit devices. These and all other variations which basically rely upon the teachings by which this disclosure has advanced the art are properly considered within the scope of this invention as defined by the appended claims.

I claim:

1. A control system for governing a plurality of multiple operating mode adjustable suspension units in an automotive vehicle, comprising:
    adjustment means for receiving an adjustment control signal and for placing said suspension units in any of said multiple adjustment modes;
    fault warning means for detecting an inability of said adjustment means to adjust one or more of said suspension units and for generating a fault warning signal in response to said detection;
    diagnostic means responsive to said fault warning signal and operatively connected with said adjustment means for determining the extent to which the ability to adjust said units has been impaired; and
    mode selection means, operatively connected with said diagnostic means, for deciding into which of said multiple operating modes said suspension units should be directed, based upon the determination of said diagnostic means, with said mode selection means further comprising means for generating an adjustment control signal corresponding to said operating modes and for communicating said signal to said adjustment means.

2. A control system according to claim 1 herein said diagnostic means determines the extent to which the ability to adjust said units has been impaired by commanding said adjustment means to sequentially place said units into at least two of said multiple operating modes and by observing the responses of said suspension units to said commands.

3. A control system according to claim 2 wherein said mode selection means decides into which of said multiple modes said suspension units should be directed, by comparing the results of said sequential operation of said suspension units by said diagnostic means to a ranked order of states of impairment of said suspension units and by selecting that attainable operating mode which is most preferable according to said ranked order.

4. A control system according to claim 3 wherein said mode selection means comprises a logic algorithm contained in a software program within a control module.

5. A control system according to claim 3 wherein said mode selection means individually selects an operating mode for each of said suspension units, based upon the results of said operation by said diagnostic means as well as upon the results of said comparison of said diagnostic operation with said ranked order.

6. A control system according to claim 3 wherein said mode selection means selects a single operating mode for all of said suspension units, based upon the results of said operation by said diagnostic means as well as upon the results of said comparison of said diagnostic operation with said ranked order.

7. A control system according to claim 1 wherein said mode selection means further comprises standard operating means for receiving vehicular operating data and means for using such data for deciding into which of said multiple operating modes said suspension units should be directed.

8. A control system according to claim 1 wherein said adjustment means comprises a multi-positionable electromagnetic motor operatively connected with said mode selection means.

9. A control system according to claim 8 wherein said fault warning means comprises a multi-positionable switch, operatively associated with said multi-positionable motor, for detecting the position of said motor and for providing a position signal to said mode selection means and to said diagnostic means.

10. A control system for governing a plurality of multiple operating mode adjustable suspension units in an automotive vehicle, comprising:
adjustment means for receiving an adjustment control signal and for placing said suspension units in any of said multiple adjustment modes;
fault warning means for detecting an inability of said adjustment means to adjust one or more of said suspension units and for generating a fault warning signal in response to said detection;
diagnostic means responsive to said fault warning signal and operatively connected with said adjustment means for determining the extent to which the ability to adjust said units has been impaired by commanding said adjustment means to sequentially place said units into at least two of said multiple operating modes and by recording the responses of each suspension unit to said commands; and
mode selection means, operatively connected with said diagnostic means, for deciding into which of said multiple operating modes each of said suspension units should be directed, based upon the recorded suspension unit responses obtained by said diagnostic means, with said mode selection means further comprising means for generating an adjustment control signal corresponding to said operating modes and for communicating an appropriate signal to each said adjustment means.

11. A control system according to claim 10 wherein said mode selection means decides which of said multiple modes each of said suspension units should be directed by comparing the results of said sequential operation of each suspension unit by said diagnostic means to a ranked order of states of impairment of said suspension units and by selecting the individual operating mode for each suspension unit which is most preferable according to said ranked order.

12. A control system according to claim 10 wherein said mode selection means further comprises standard operating means for receiving vehicular operating data and means for using such data as well as said recorded suspension unit responses for deciding into which of said multiple operating modes said suspension units should be directed.

13. A control system for governing a plurality of automotive suspension units adjustable to normal and firm operating positions, comprising:
adjustment means for receiving an adjustment control signal and for placing said suspension units into either of said operating positions;
fault warning means for detecting an inability of said adjustment means to adjust one or more of said suspension units and for generating a fault warning signal in response to said detection;
diagnostic means responsive to said fault warning signal and operatively connected with said adjustment means for commanding said adjustment means to sequentially place said units into said firm and normal operating positions and for noting the results of said commands; and
mode selection means operatively connected with said diagnostic means for deciding whether said suspension units should be directed into said normal or said firm position, with said mode selection means comprising means for comparing the results of said sequential operation of said suspension units by said diagnostic means to a ranked order of states of impairment of said suspension units and by selecting the operating mode which is most preferable according to said ranked order, with said mode selection means further comprising means for generating an adjustment control signal corresponding to said firm and normal operating modes and for communicating said signal to said adjustment means.

14. A control system according to claim 13 wherein said mode selection means selects a single operating mode into which each suspension unit is directed.

15. A control system according to claim 13 wherein said mode selection means selects an individual operating mode into which each suspension unit is directed.

16. A method for governing a plurality of multiple operating mode adjustable suspension units in an automotive vehicle, comprising the steps of:
detecting a loss of control of the adjustability of one or more of said suspension units;
attempting to place said suspension units in an authorized operating position upon detection of such loss of control;
detecting the resulting operating position of the suspension units, and inhibiting the control system from making any further changes in the operating positions of the suspension units in the event that the suspension units have moved to said authorized operating position, but taking the following additional steps in the even that said suspension units have not assumed such authorized operating position:

determining the extent to which the ability to adjust said suspension units has been impaired;

selecting an operating position for the suspension units based upon said determination of the extent of adjustment impairment;

directing the suspension units into the selected operating position.

17. A method according to claim 16 wherein said authorized operating position comprises the position which the suspension units occupied at a time immediately preceding said detection of the loss of control over adjustability.

18. A method according to claim 16 wherein said authorized operating position comprises a normal operating position which allows the suspension units to operate in an acceptable manner.

* * * * *